United States Patent
Kitai

(10) Patent No.: US 11,570,366 B2
(45) Date of Patent: Jan. 31, 2023

(54) IMAGE CAPTURING CONTROL APPARATUS CAPABLE OF DISPLAYING OSD AND IMAGE CAPTURING CONTROL METHOD

(71) Applicant: CANON KABUSHIKI KAISHA, Tokyo (JP)

(72) Inventor: Shimpei Kitai, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/152,849

(22) Filed: Jan. 20, 2021

(65) Prior Publication Data
US 2021/0235022 A1 Jul. 29, 2021

(30) Foreign Application Priority Data
Jan. 23, 2020 (JP) .............................. JP2020-009306

(51) Int. Cl.
| | |
|---|---|
| H04N 5/232 | (2006.01) |
| H04N 5/272 | (2006.01) |
| H04N 5/91 | (2006.01) |
| H04N 5/265 | (2006.01) |
| G06F 3/0488 | (2022.01) |

(52) U.S. Cl.
CPC ..... *H04N 5/232939* (2018.08); *G06F 3/0488* (2013.01); *H04N 5/232935* (2018.08); *H04N 5/265* (2013.01); *H04N 5/272* (2013.01); *H04N 5/91* (2013.01); *G06F 2203/04804* (2013.01)

(58) Field of Classification Search
CPC ............. H04N 5/23206; H04N 5/2621; H04N 5/23222; H04N 5/23293; G06F 3/04842; G06F 2203/04803; G06T 7/30; G06T 5/001; G06T 5/20; G06T 7/90; G06T 2207/20024; G06T 2207/30244; G06T 2207/10044
USPC ...................................................... 348/222.1
See application file for complete search history.

(56) References Cited

U.S. PATENT DOCUMENTS

| | | | | |
|---|---|---|---|---|
| 2013/0314433 | A1* | 11/2013 | Ko ........................... | G09G 3/20 345/592 |
| 2015/0070523 | A1* | 3/2015 | Chao ........................ | G06T 5/50 348/218.1 |
| 2015/0229828 | A1* | 8/2015 | Ichikawa ........... | H04N 5/23206 348/207.11 |

(Continued)

FOREIGN PATENT DOCUMENTS

JP 5959217 B2 8/2016

*Primary Examiner* — Xi Wang
(74) *Attorney, Agent, or Firm* — Rossi, Kimms & McDowell LLP

(57) ABSTRACT

An image capturing control apparatus that enables a user to recognize a transparency of OSD for recording. A system controller sets a transparency of OSD superimposed on a captured LV image and sets whether or not to record the captured image in a state combined with the OSD, as an image file. The OSD is displayed in a state superimposed on the LV image at a transparency of OSD for display, regardless of a setting concerning recording of the image file, and in a case where it is set to record the LV image in the state combined with the OSD, the OSD is displayed according to a specific operation, in a state superimposed on the LV image, at a transparency of OSD for recording, regardless of the transparency of OSD for display.

14 Claims, 5 Drawing Sheets

(56) References Cited

U.S. PATENT DOCUMENTS

2017/0359523 A1* 12/2017 Rubinstein ................ G06T 7/30

* cited by examiner

IMAGE CAPTURING CONTROL APPARATUS CAPABLE OF DISPLAYING OSD AND IMAGE CAPTURING CONTROL METHOD

BACKGROUND OF THE INVENTION

Field of the Invention

The present invention relates to a technique for displaying OSD.

Description of the Related Art

On a display of an apparatus, such as a camera, that shoots a moving image or a still image, on-screen display (OSD) has been conventionally used to display information, such as shooting settings, such that the information is superimposed on an image of an object as a shooting target.

In recent years, to reduce glare of on-screen display, felt when shooting a dark scene, there has been proposed a technique (OSD transparency) for making OSD transparent by user's setting (see e.g. Japanese Patent No. 5959217). In the above-mentioned technique, a transparency of OSD can be set individually for each of video output destinations, such as display devices including a liquid crystal display (LCD), a viewfinder (VF), and a serial digital interface (SDI), and recording media for recording images.

Further, there has been proposed a technique (OSD recording) for recording OSD displayed on a live view (LV) screen at the time of shooting, in a state superimposed on and combined with a LV image.

In the technique for individually setting a transparency of OSD for each video output destination, a transparency of OSD for display, which is set for a display device, and a transparency of OSD for recording, which is set for a storage medium, are sometimes different from each other. In this case, even when a user views a screen displayed according to the transparency of OSD for display, the user cannot recognize the transparency of OSD for recording.

SUMMARY OF THE INVENTION

The present invention provides an image capturing control apparatus that enables a user to recognize a transparency of OSD for recording, an image capturing control method, a program, and a storage medium.

The present invention provides an image capturing control apparatus including at least one processor or circuit configured to perform the operations of the following units: a transparency setting unit configured to set a transparency of OSD superimposed on a LV image captured by an image capturing unit, a combined recording-setting unit configured to set whether or not to record the LV image captured by the image capturing unit in a state combined with the OSD, as an image file, and a control unit configured to control to display the OSD in a state superimposed on the LV image at a transparency of OSD for display, which is set by the transparency setting unit, regardless of the setting performed by the combined recording-setting unit, and control, in a case where the combined recording-setting unit sets to record the LV image in the state combined with the OSD, as the image file, display the OSD according to a specific operation, in a state superimposed on the LV image at the transparency of OSD for recording, regardless of the transparency of OSD for display.

Further features of the present invention will become apparent from the following description of exemplary embodiments (with reference to the attached drawings).

DESCRIPTION OF THE EMBODIMENTS

An exemplary embodiment of the present invention will be described in detail below with reference to the accompanying drawings. It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1:
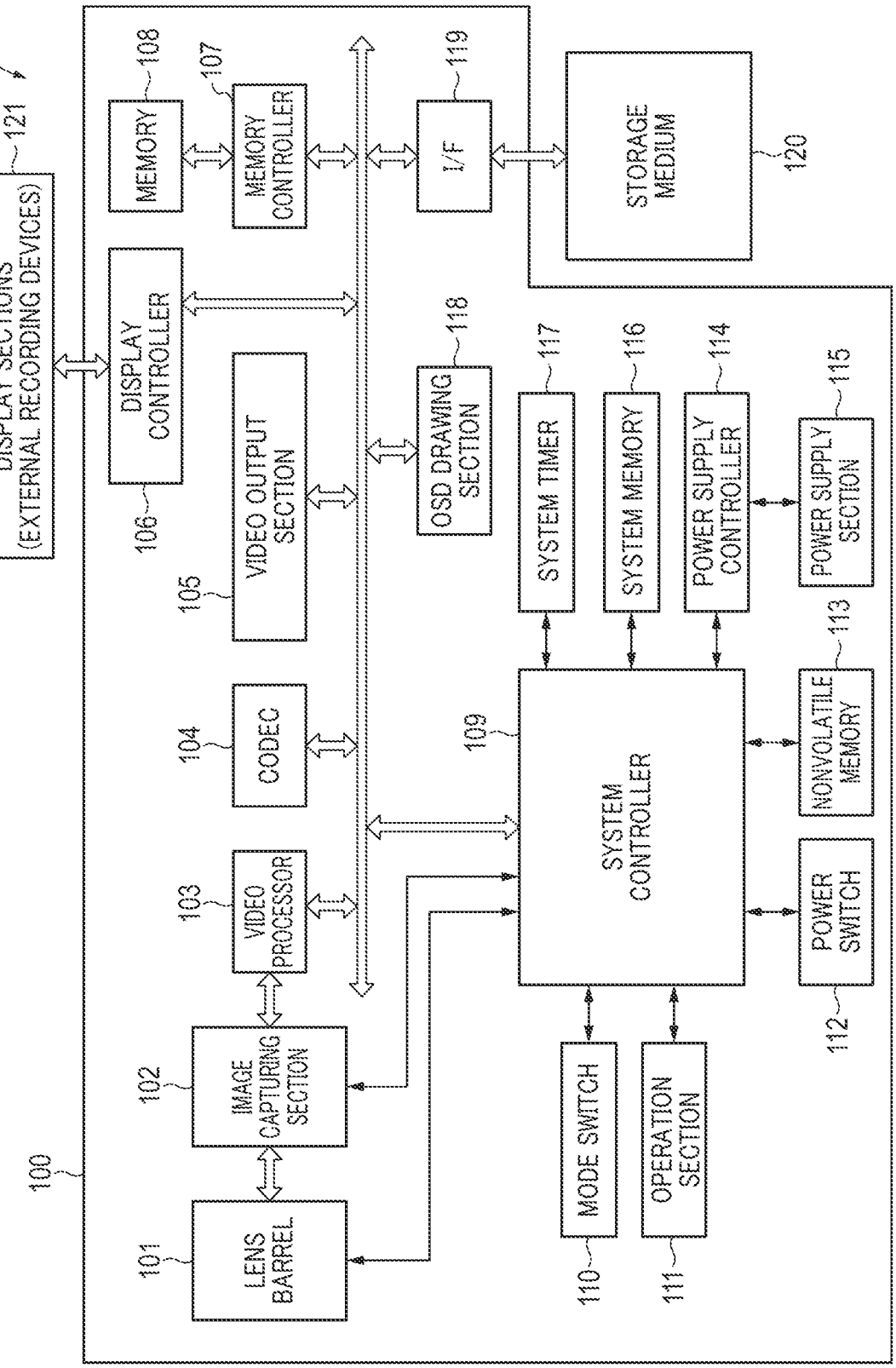
FIG. 1 is a block diagram showing the configuration of a digital video camera as an example of an image capturing control apparatus according to an embodiment of the present invention.

FIG. 1 is a block diagram showing the configuration of a digital video camera 10 as an image capturing control apparatus according to an embodiment of the present invention. A casing 100 contains various elements described hereinafter.

A lens barrel 101 has image capturing lenses including a focus lens and an anti-shake lens, and a diaphragm mechanism, none of which are shown. The lens barrel 101 may be formed integrally with the casing 100 or may be formed separable from the casing 100.

An image capturing section 102 has an image capturing sensor, not shown, that converts an optical image formed by light collected by the image capturing lenses included in the lens barrel 101 to analog electrical signals, and an analog-to-digital converter, not shown, that converts the analog electrical signals to digital signals (video data).

A video processor 103 executes predetermined image processing, such as resizing, trimming, color conversion, and distortion correction, on video data output from the image capturing section 102 or a memory controller 107 to generate VRAM data in a memory 108 via the memory controller 107. Further, the video processor 103 executes predetermined calculation processing on the video data and supplies a result of the calculation to a system controller 109. The above-mentioned calculation result is used for various control processing, such as exposure control, ranging control, and anti-shake control. For example, AF (Auto Focus) processing, AE (Auto Exposure) processing, and anti-shake processing are executed based on a result of object detection performed through calculation by the video processor 103. Further, the video processor 103 can execute AWB (Auto White Balance) processing based on calculation performed on the video data.

A CODEC 104 encodes the VRAM data generated by the video processor 103 according to a predetermined moving image compression method (such as MPEG-2 or H. 264). Further, the CODEC 104 decodes encoded video data supplied from the memory controller 107 to generate new VRAM data. The new VRAM data is subjected to predetermined image processing by the video processor 103 and is supplied to the memory controller 107.

A video output section 105 superimposes a plurality of items of VRAM data read out from the memory 108 via the memory controller 107 to generate video signals. The video output section 105 can add metadata determined by the system controller 109 to the video signals. Note that the video output section 105 can independently generate individual video signals for each of a plurality of display sections (external recording devices) 121 and output the individual video signals thereto.

The display section 121 is a display device connected to the digital video camera 10 and displays video signals input thereto. The display section 121 can be formed by a plurality of display devices. The display section 121 may be formed by a display member, such as a liquid crystal panel or an organic EL panel. Further, the video signals supplied to the display section 121 may also be supplied to an external recording device that records the video signals as an image file.

A display controller 106 establishes connection to the display section 121 and outputs video signals to the display section 121. The digital video camera 10 and the display section 121 can be connected to each other according to the SDI (Serial Digital Interface) standard. Note that the digital video camera 10 and the display section 121 may be wiredly or wirelessly connected by another method. For example, the digital video camera 10 and the display section 121 may be connected to each other by an HDMI (registered trademark) cable to transmit and receive video signals and information on signal standards. Further, the digital video camera 10 and the display section 121 may be connected to each other by a wireless LAN.

The memory controller 107 arbitrates access requests from the components to the memory 108.

The memory 108 stores VRAM data handled by the video processor 103, the CODEC 104, the video output section 105, and an OSD drawing section 118. Further, the memory 108 is capable of temporarily storing encoded video data output from the CODEC 104 and encoded video data read out from a storage medium 120. The memory 108 has a storage capacity sufficient to store a predetermined duration of moving images and sound.

The system controller 109 is control means for comprehensively controlling the overall operation of the digital video camera 10, and is implemented by an operation processor, such as a CPU (Central Processing Unit). Further, the system controller 109 may have a plurality of CPU cores. The plurality of CPU cores can share and process tasks described in a program, referred to hereinafter.

A nonvolatile memory 113 is an electrically recordable and erasable storage medium. The nonvolatile memory 113 records programs and control information, such as parameters, which are used by the system controller 109. The above-mentioned programs include programs for executing processes shown in flowcharts, referred to hereinafter.

A system memory 116 is a volatile storage medium and is implemented e.g. by a RAM (Radom Access Memory). Note that the memory 108 may also be used as the system memory 116. In this case, an access to the memory 108 as the system memory 116 is arbitrated by the memory controller 107, and hence a small-capacity memory (such as a cash memory) which can be accessed at high speed may be provided in a state directly connected to the system controller 109.

The system controller 109 controls the components of the digital video camera 10 by loading programs as well as variables and constants for operation from the nonvolatile memory 113 into the system memory 116 and executing the loaded program to realize each operation of the present embodiment. The system controller 109 can control a display operation performed by the memory 108, the OSD drawing section 118, and the video output section 105.

A mode switch 110 is a switch used to select an operation mode of the digital video camera 10. The operation mode (such as a camera mode and a reproduction mode) identified by the position of the switch is notified to the system controller 109.

An operation section 111 is operating means used to input various instructions to the system controller 109. The operation section 111 includes the following elements, for example:

a menu button for displaying a menu screen for configuring various settings, on the display section 121;

a cancel button:

a cross key (an up direction key, a down direction key, a left direction key, and a right direction key):

a SET button;

function switching buttons (including an AF/MF switching button);

a REC button for instructing start and stop of recording a moving image; and an assign button to which a desired function can be assigned by menu setting.

A user can intuitively input various setting instructions using the menu screen displayed on the display section 121 as well as the cross key and the SET button.

A power switch 112 is a push button used to switch between a power-on state and a power-off state.

A power supply controller 114 includes a battery detection circuit, a DC-DC converter, and a switching circuit for switching blocks to be energized, none of which are shown, and detects whether or not a battery is attached, a type of the attached battery, and a battery remaining amount. The power supply controller 114 controls the DC-DC converter based on results of the above-mentioned detection and an instruction received from the system controller 109 to supply a voltage required for the operation to the components (the storage medium 120 and the like) for a required time period.

A power supply section 115 is implemented by at least one of a primary battery (such as an alkaline battery, a lithium battery, or the like), a secondary battery (such as a NiCd battery, a NiMH battery, a Li battery, or the like), and an AC adapter.

A system timer 117 functions as a timing generating section used for various controls and also as a time measurement section that measures time of a built-in clock, not shown. The system controller 109 controls the operations of the components based on a timing generated by the system timer 117.

The OSD drawing section 118 provides an on-screen display function for superimposing setting information on video data. More specifically, the OSD drawing section 118 renders character strings and icons which express a state and settings of the digital video camera 10, various display frames, and a marker (in short, OSD), on VRAM data stored in the memory 108. The display information, such as character strings and icons, used for the above-mentioned on-screen display function, is stored in the nonvolatile memory 113, and is loaded into the OSD drawing section 118 on an as needed basis.

An interface 119 is a connection interface with the storage medium 120 which can be connected to the digital video camera 10.

The storage medium 120 records encoded video data and data associated with the video data as an image file. The encoded video data stored in the memory 108 is supplied via the interface 119 to the storage medium 120 for storage therein. Further, the encoded video data and the associated data, which are stored in the storage medium 120, are read out by the interface 109 and transferred to the memory 108. The storage medium 120 may be a medium which can be removably attached to the digital video camera 10 (such as a memory card, a HDD, another type of disk, or the like), or may be a medium incorporated in the digital video camera 10 (such as a flash memory, a HDD, or the like).

Figure 2A:
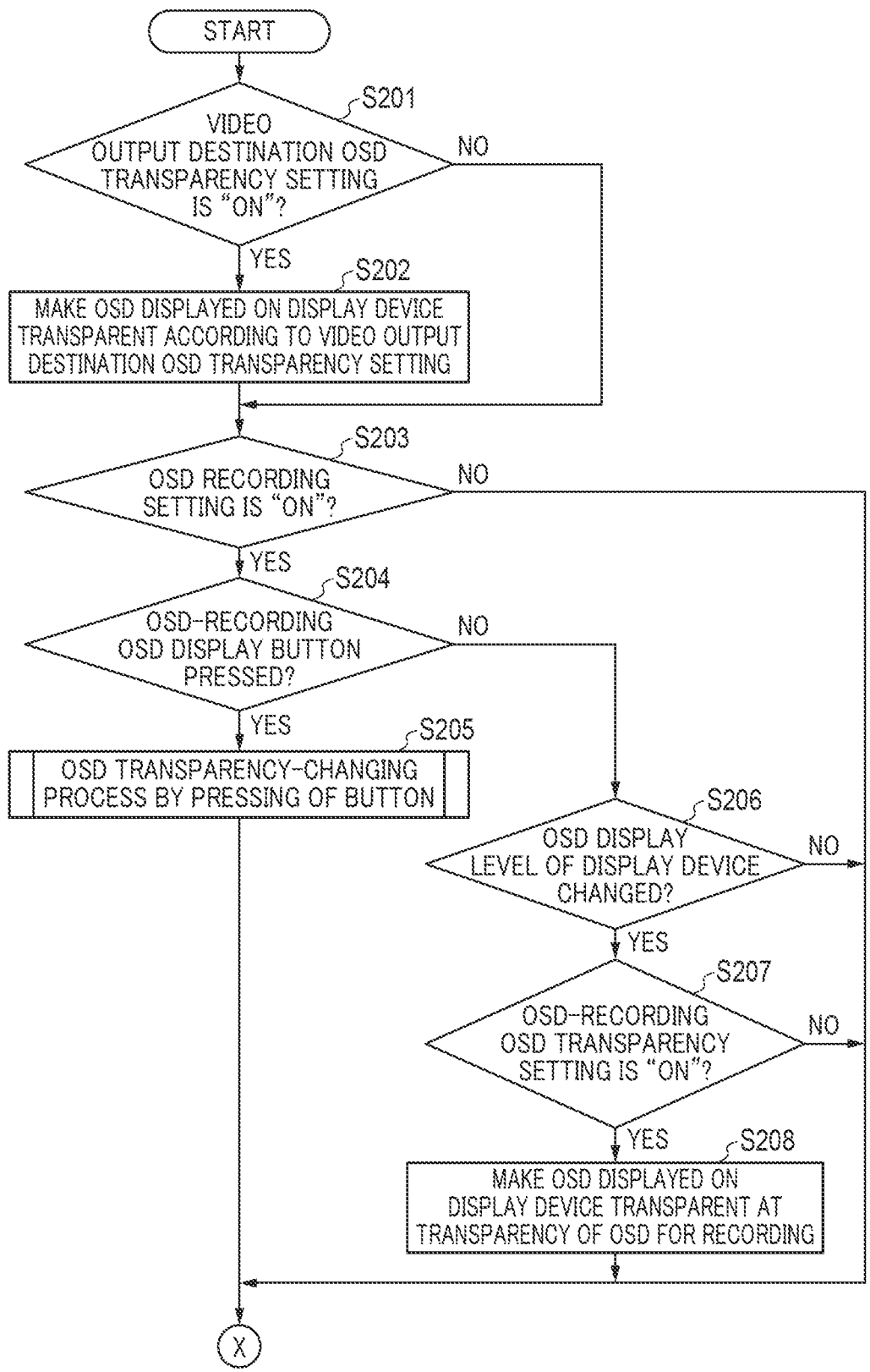
FIG. 2A is a flowchart showing an operation of the digital video camera.
Figure 2B:
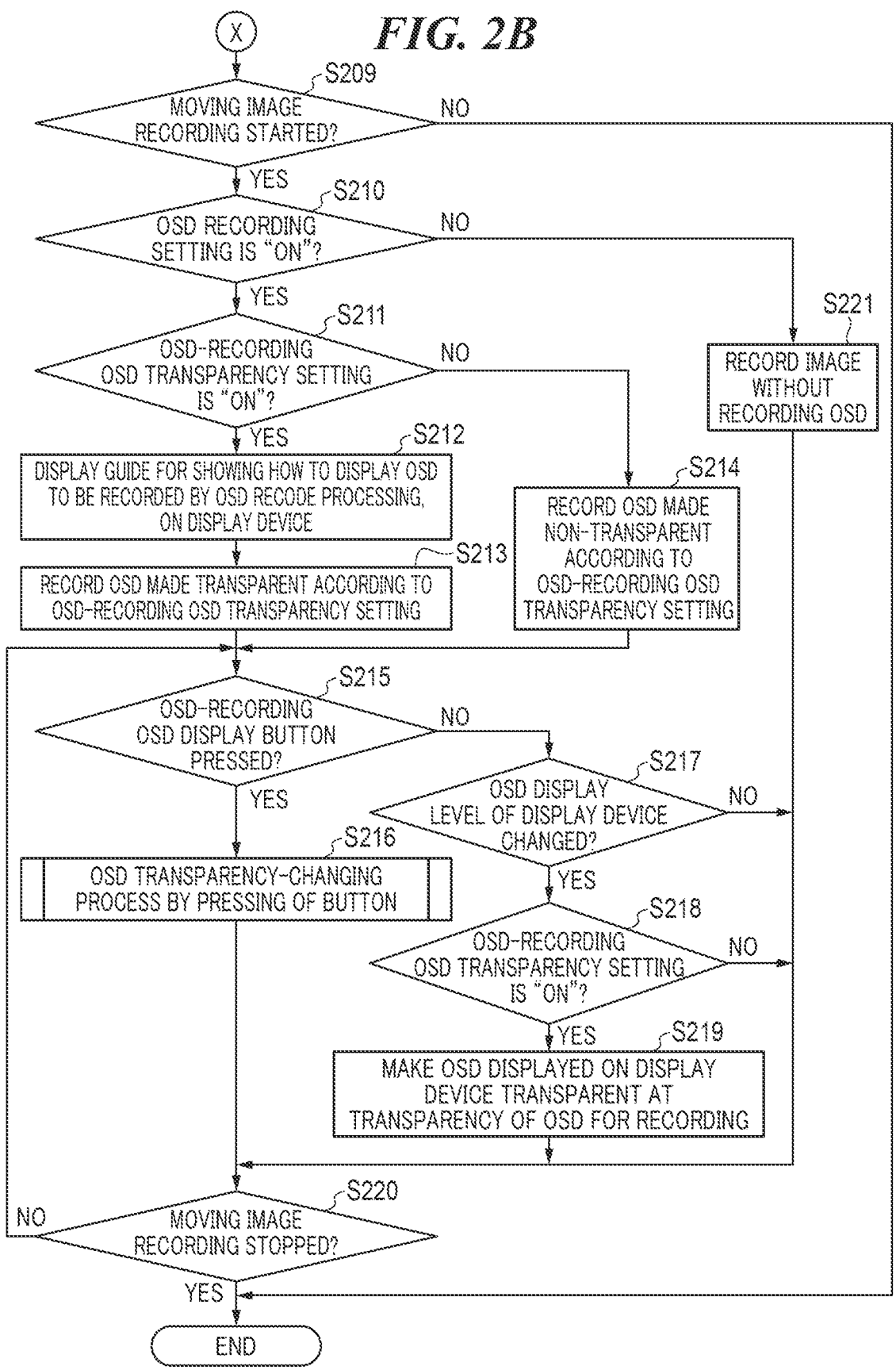
FIG. 2B is a continuation of FIG. 2A.
Figure 2C:
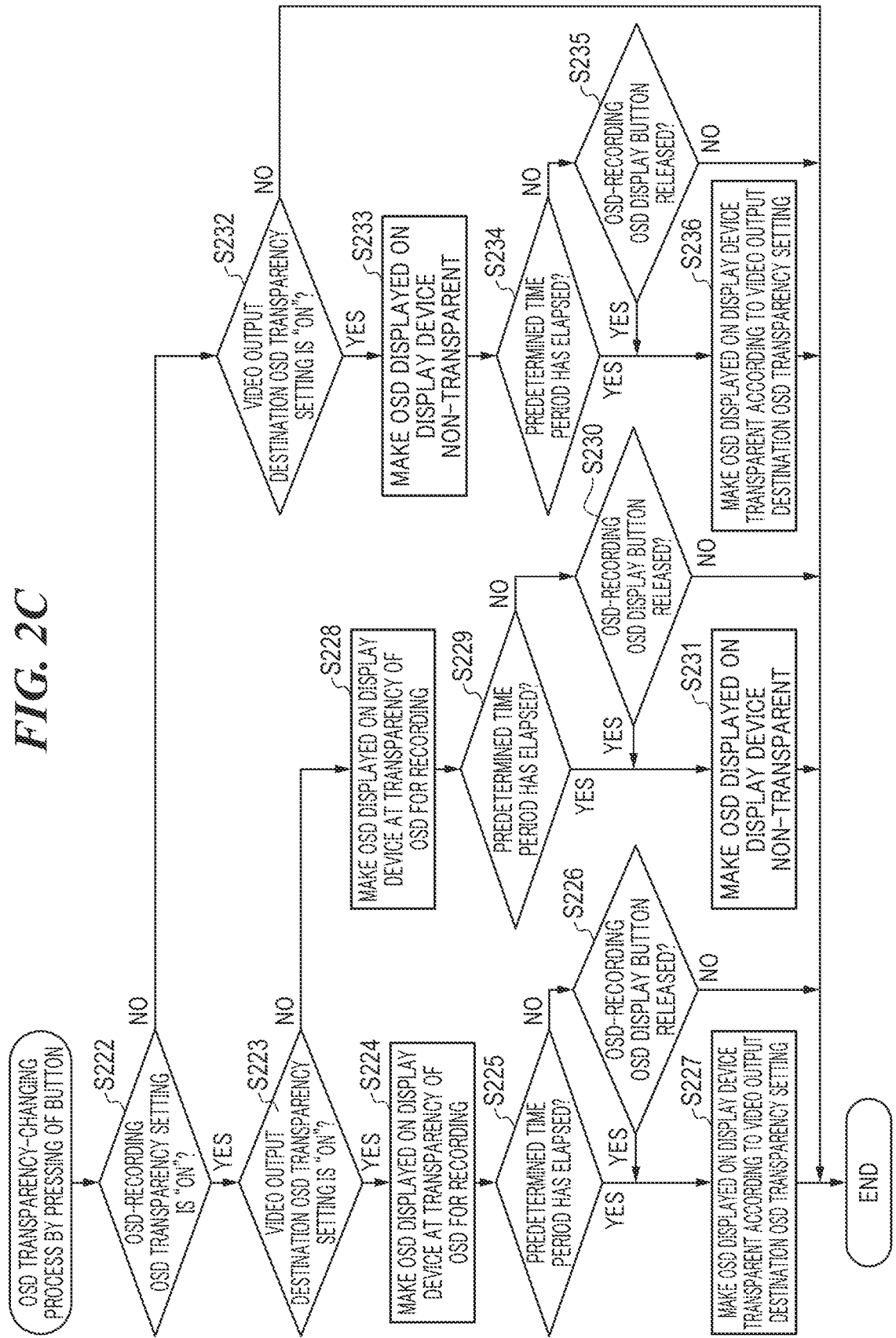
FIG. 2C is an OSD transparency-changing process performed in steps in FIGS. 2A and 2B.
Figure 3A:
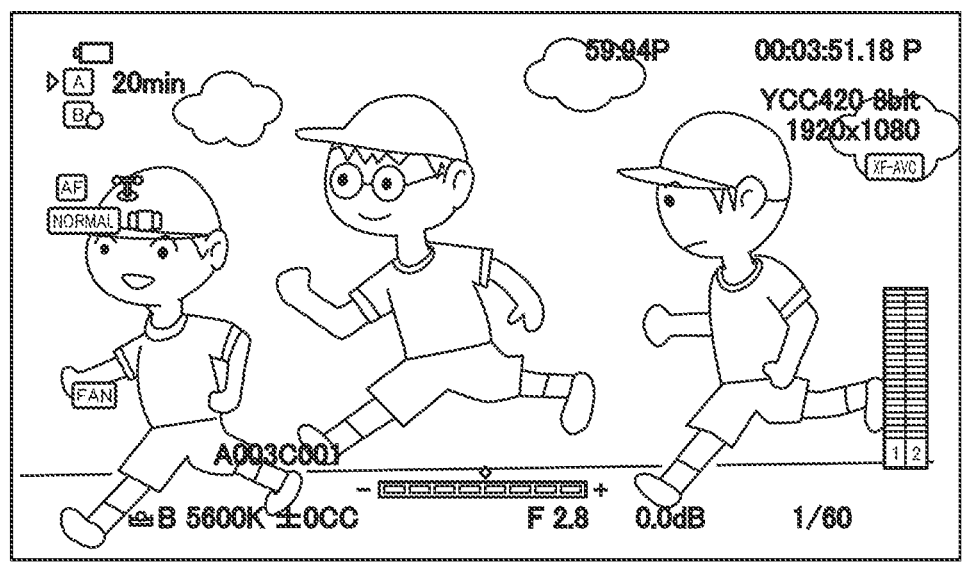
FIGS. 3A and 3B are explanatory views each showing an example of a display screen displayed by the digital video camera.
Figure 3B:
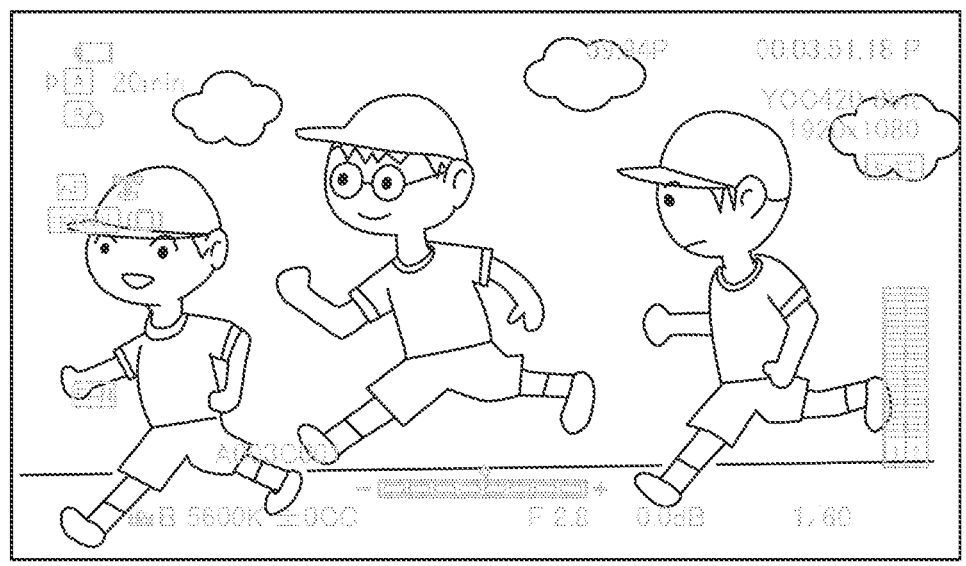

A description will be given of the operation of the digital video camera 10 according to the embodiment of the present invention with reference to FIGS. 2A to 2C and 3A and 3B. FIGS. 2A to 2C are flowcharts showing the operation of the digital video camera 10. FIGS. 3A and 3B are explanatory views each showing an example of a display screen displayed on the display section 121 of the digital video camera 10.

First, the operation for controlling display and recording of OSD in the present embodiment will be described with reference to FIGS. 2A and 2B.

In a step S201, the system controller 109 reads out a setting of a video output destination OSD transparency (transparency of OSD for display) from the system memory 116. The video output destination OSD transparency is information indicating a transparency of OSD at an output destination to which the video output section 105 supplies video signals, and is set for each display device in a case where a plurality of display devices exist as the display section 121. The video output destination OSD transparency is set from among a plurality of transparencies (including a transparency zero (non-transparent)) according to a user's operation. If the read video output destination OSD transparency is set to "on" (valid), the system controller 109 proceeds to a step S202. On the other hand, if the read video output destination OSD transparency is not set to "on", the system controller 109 proceeds to a step S203.

In the step S202, the system controller 109 (transparency setting unit) controls the OSD drawing section 118 so as to make the OSD displayed on the display section 121 transparent according to the setting of the video output destination OSD transparency, which is acquired in the step S201.

In the step S203, the system controller 109 (combined recording-setting unit) reads out an OSD recording setting from the system memory 116. The OSD recording setting is information indicating whether or not to record video data (LV image) displayed on the display section 121 in a state having OSD superimposed thereon. If the read OSD recoding setting is set to "on" (valid), the system controller 109 proceeds to a step S204. On the other hand, if the read OSD recording setting is not set to "on", the system controller 109 proceeds to a step S209 in FIG. 2B.

In the step S204, the system controller 109 (control unit) determines whether or not an OSD display button for OSD recording (hereafter referred to as "OSD-recording OSD display button") on the operation section 111 is being pressed (a specific operation is being performed). If it is determined that the OSD-recording OSD display button is being pressed, the system controller 109 proceeds to a step S205. On the other hand, if it is determined that the OSD-recording OSD display button is not being pressed, the system controller 109 proceeds to a step S206.

Details of the step S205 will be described hereinafter with reference to FIG. 2C.

In the step S206, the system controller 109 determines whether or not the OSD display level in the display section 121 has been switched (changed). The OSD display level is information indicating the display contents and the display form of the OSD displayed on the display section 121. By switching the OSD display level, the number, size, display position, and so forth of the OSD displayed on the display section 121 are changed. If it is determined that the OSD display level has been switched, the system controller 109 proceeds to a step S207. On the other hand, if it is determined that the OSD display level has not been switched, the system controller 109 proceeds to the step S209 in FIG. 2B.

In the step S207, the system controller 109 reads out a setting of a transparency of OSD for OSD recording (transparency of OSD for recording) from the system memory 116. The setting of a transparency of OSD for OSD recording (hereinafter referred to as "the OSD-recording OSD transparency setting") is information indicating a transparency of OSD for recording video data in a state having the OSD superimposed thereon. If the read OSD-recording OSD transparency setting is set to "on" (valid), the system controller 109 proceeds to a step S208. On the other hand, if it is determined that the read OSD-recording OSD transparency setting is not set to "on", the system controller 109 proceeds to the step S209 in FIG. 2B.

In the step S208, the system controller 109 controls the OSD drawing section 118 to make the OSD displayed on the display section 121 transparent according to the OSD-recording OSD transparency setting which is acquired in the step S207.

In the step S209 in FIG. 2B, the system controller 109 determines whether or not the start of recording of a moving image has been instructed. The start of recording of a moving image may be instructed by the system controller 109 e.g. based on a signal indicating that the REC button on the operation section 111 has been pressed. If it is determined that the start of recording of a moving image has been instructed, the system controller 109 proceeds to a step S210. On the other hand, if it is determined that the start of recording of a moving image has not been instructed, the system controller 109 terminates the present process.

In the step S210, the system controller 109 reads out the OSD recording setting from the system memory 116. If the read OSD recoding setting is set to "on" (valid), the system controller 109 proceeds to a step S211. On the other hand, if the read OSD recording setting is not set to "on", the system controller 109 proceeds to a step S221. In the step 221, the system controller 109 causes a LV image to be recorded in the memory 108, without causing the OSD to be combined with (superimposed on) the LV image, and proceeds to a step S220.

In the step S211, the system controller 109 reads out the OSD-recording OSD transparency setting from the system memory 116. If the read OSD-recording OSD transparency setting is set to "on" (valid), the system controller 109 proceeds to a step S212. On the other hand, if it is determined that the read OSD-recording OSD transparency setting is not set to "on", the system controller 109 proceeds to a step S214.

In the step S212, the system controller 109 controls to display, on the display section 121, a guide for showing how to display OSD to be recorded together with video data by OSD record processing, on a display device.

In a step S213, the system controller 109 causes the OSD made transparent according to the OSD-recording OSD transparency setting to be recorded in the memory 108 in a state combined with (superimposed on) the LV image.

On the other hand, in the step S214, the system controller 109 causes the OSD data made non-transparent according to the OSD-recording OSD transparency setting to be recorded in the memory 108 in a state combined with (superimposed on) the LV image.

In a step S215, the system controller 109 determines whether or not the OSD-recording OSD display button on the operation section 111 is being pressed (the specific operation is being performed). If it is determined that the OSD-recording OSD display button is being pressed, the system controller 109 proceeds to a step S216. On the other hand, if it is determined that the OSD-recording OSD display button is not being pressed, the system controller 109 proceeds to a step S217.

The step S216 is the same as the step S205 in FIG. 2A and will be described hereinafter with reference to FIG. 2C. The step S217 and steps S218 and S219 are the same as the steps S206 to S208, and hence description thereof is omitted.

In a step S220, the system controller 109 determines whether or not the stop of recording the moving image has been instructed. The stop of recording the moving image may be instructed by the system controller 109 e.g. based on a signal indicating that the REC button on the operation section 111 has been pressed. If it is determined that the stop of recording the moving image has been instructed, the system controller 109 terminates the present process. On the other hand, if it is determined that the stop of recording the moving image has not been instructed, the system controller 109 returns to the step S215 and repeats the step S215 et seq.

Next, the operation performed in the case where the OSD-recording OSD display button is being pressed (i.e. the specific operation is being performed) in the above-mentioned steps S205 and S216 will be described with reference to FIG. 2C.

In a step S222, the system controller 109 reads out the OSD-recording OSD transparency setting from the system memory 116. If the read OSD-recording OSD transparency setting is set to "on" (valid), the system controller 109 proceeds to a step S223. On the other hand, if it is determined that the read OSD-recording OSD transparency setting is not set to "on", the system controller 109 proceeds to a step S232.

In the step S223, the system controller 109 reads out the setting of the video output destination OSD transparency from the system memory 116. If the read video output destination OSD transparency is set to "on" (valid), the system controller 109 proceeds to a step S224. On the other hand, if it is determined that the read video output destination OSD transparency is not set to "on", the system controller 109 proceeds to a step S228.

In the step S224, the system controller 109 controls the OSD drawing section 118 to make the OSD displayed on the display section 121 transparent according to the OSD-recording OSD transparency setting acquired in the step S222.

In a step S225, the system controller 109 determines whether or not a predetermined time period has elapsed after the OSD displayed on the display section 121 was made transparent. If it is determined that the predetermined time period has elapsed, the system controller 109 proceeds to a step S227. On the other hand, if it is determined that the predetermined time period has not elapsed (it is within the predetermined time period), the system controller 109 proceeds to a step S226.

In the step S226, the system controller 109 determines whether or not the OSD-recording OSD display button on the operation section 111 is not being pressed (has been released). If it is determined that the OSD-recording OSD display button has been released, the system controller 109 proceeds to the step S227. On the other hand, if it is determined that the OSD-recording OSD display button is being pressed, the system controller 109 terminates the present process (i.e. proceeds to the step following the step S205 or S216).

In the step S227, the system controller 109 controls the OSD drawing section 118 to make the OSD displayed on the display section 121 transparent according to the video output destination OSD transparency setting acquired in the step S223. After that, the system controller 109 terminates the present process (i.e. proceeds to the step following the step S205 or S216).

In the step S228, the system controller 109 controls the OSD drawing section 118 to make the OSD displayed on the display section 121 transparent according to the OSD-recording OSD transparency setting acquired in the step S222.

In a step S229, the system controller 109 determines whether or not the predetermined time period has elapsed after the OSD displayed on the display section 121 was made transparent. If it is determined that the predetermined time period has elapsed, the system controller 109 proceeds to a step S231. On the other hand, if it is determined that the predetermined time period has not elapsed (it is within the predetermined time period), the system controller 109 proceeds to a step S230.

In the step S230, the system controller 109 determines whether or not the OSD-recording OSD display button on the operation section 111 is not being pressed (has been released). If it is determined that the OSD-recording OSD display button has been released, the system controller 109 proceeds to the step S231. On the other hand, if it is determined that the OSD-recording OSD display button is being pressed, the system controller 109 terminates the present process (i.e. proceeds to the step following the step S205 or S216).

In the step S231, the system controller 109 controls the OSD drawing section 118 to make non-transparent the OSD displayed on the display section 121. After that, the system controller 109 terminates the present process (i.e. proceeds to the step following the step S205 or S216).

In the step S232, the system controller 109 reads out the video output destination OSD transparency setting from the system memory 116. If the read video output destination OSD transparency is set to "on" (valid), the system controller 109 proceeds to a step S233. On the other hand, if it is determined that the read video output destination OSD transparency is not set to "on", the system controller 109 terminates the present process (i.e. proceeds to the step following the step S205 or S216).

In the step S233, the system controller 109 controls the OSD drawing section 118 to make non-transparent the OSD displayed on the display section 121.

In a step S234, the system controller 109 determines whether or not the predetermined time period has elapsed after the OSD displayed on the display section 121 was made non-transparent. If it is determined that the predetermined time period has elapsed, the system controller 109 proceeds to a step S236. On the other hand, if it is determined that the predetermined time period has not elapsed (it is within the predetermined time period), the system controller 109 proceeds to a step S235.

In the step S235, the system controller 109 determines whether or not the OSD-recording OSD display button on the operation section 111 is not being pressed (has been released). If it is determined that the OSD-recording OSD display button has been released, the system controller 109 proceeds to the step S236. On the other hand, if it is determined that the OSD-recording OSD display button is being pressed, the system controller 109 terminates the present process (i.e. proceeds to the step following the step S205 or S216).

In the step S236, the system controller 109 controls the OSD drawing section 118 to make transparent the OSD displayed on the display section 121 according to the video output destination OSD transparency setting acquired in the step S232. After that, the system controller 109 terminates the present process (i.e. proceeds to the step following the step S205 or S216).

The screen displayed on the display section 121 will be described with reference to FIGS. 3A and 3B. FIG. 3A shows an example of the screen displayed in a case where the OSD is made non-transparent. FIG. 3B shows an example of the screen displayed in a case where the OSD is made transparent.

As shown in FIG. 3A, in the case where the OSD is made non-transparent, the display section 121 displays the non-transparent OSD such that images of objects (three persons, the ground, and so forth, in the illustrated example) under the OSD are hidden. The screen including the non-transparent OSD, shown in FIG. 3A, is displayed on the display section 121 by the control performed e.g. in the steps S231 and S233.

On the other hand, as shown in FIG. 3B, in the case where the OSD is made transparent, the display section 121 displays a transparent OSD made transparent such that images of objects thereunder are not completely hidden. The above-described transparency of OSD also has an effect of making the brightness of the displayed object images and the brightness of the OSD close to each other. The screen including the transparent OSD, shown in FIG. 3B, is displayed on the display section 121 by the control performed e.g. in the steps S202 and S208.

As described above, in the case where a transparency of OSD for display and a transparency of OSD for recording are simultaneously used, the digital video camera 10 according to the present embodiment displays, according to the specific operation, the OSD on the display section 121 not at the transparency of OSD for display, but at the transparency of OSD for recording.

The specific operation is e.g. the operation for pressing the OSD-recording OSD display button included in the operation section 111. According to the above-described configuration, the user can recognize the OSD displayed at the transparency of OSD for recording, and hence the user is enabled to easily recognize an image to be displayed based on a completed image file recorded in the storage medium 120. Furthermore, if the OSD recoding setting is set to "on", even if a specific operation (the operation for pressing the OSD-recording OSD display button) is performed, the display of OSD is not changed and the transparency of the OSD is maintained at the transparency of OSD for display.

Other Embodiments

In the above-described embodiment, the transparency of OSD to be displayed on the display section 121 is controlled according to whether or not the OSD-recording OSD display button on the operation section 111 is being pressed. However, a desired operation can be used to control the transparency of OSD. For example, in a configuration in which the display section 121 is implemented by a touch panel and can also function as the operation section 111, the transparency of OSD may be controlled based on a touch operation performed on the OSD displayed on the display section 121.

Although the above-described various controls are described assuming that the controls are performed by the system controller 109, they may be performed by one item of hardware or the overall operation of the apparatus may be controlled by a plurality of items of hardware (such as a plurality of processors or circuits) that share the processing operations.

Further, although in the above-described embodiment, the description is given of the case where the present invention is applied to the digital video camera 10 by way of example, this is not limitative, but the present invention can be applied to any other apparatus insofar as it is an image capturing control apparatus to which a plurality of OSD transparencies can be selectively applied. That is, the present invention can be applied to a personal computer or a PDA (Personal Digital Assistant) having an image capturing function, a mobile telephone terminal, a mobile image viewer, a printer apparatus equipped with a display, a digital photo frame, a music player, a game machine, an electronic book reader, and so forth.

Further, the present invention can be applied not only to the image capturing apparatus body, but also to a control apparatus that communicates with an image capturing apparatus (including a network camera) and remotely controls the image capturing apparatus via wired or wireless communication. Examples of the apparatus that remotely controls the image capturing apparatus include a smartphone, a tablet PC, and a desktop PC. The image capturing apparatus can be remotely controlled by notifying the image capturing apparatus of commands for causing the image capturing apparatus to perform various operations and settings, from the control apparatus, according to operations performed on the control apparatus and processing performed by the control apparatus. Further, the control apparatus may be configured to be capable of receiving a live view image shot by the image capturing apparatus via wired or wireless communication and displaying the received live view image on the control apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-009306 filed Jan. 23, 2020, which is hereby incorporated by reference herein in its entirety.

What is claimed is:

1. An image capturing control apparatus including at least one processor or circuit configured to execute:
   a transparency setting task that sets a transparency of on screen display (OSD) superimposed on a live view (LV) image captured by an image capturing unit, wherein the transparency setting task individually sets a transparency of OSD for displaying and a transparency of OSD for recording;
   a combined recording-setting task that sets whether or not to record the LV image captured by the image capturing task combined with the OSD to an image file; and
   a control task that controls to display the OSD superimposed on the LV image at the set transparency of OSD for displaying,
   wherein, in a state where the combined recording-setting task has been set to record the LV image combined with the OSD to the image file, the control task controls to display the OSD superimposed on the LV image at the set transparency of OSD for recording regardless of the set transparency of OSD for displaying in response to a start of a specific operation, and to display the OSD superimposed on the LV image at the set transparency of OSD for displaying in response to an end of the specific operation.

2. The image capturing control apparatus according to claim 1, wherein in a state where the combined recording-setting task has set to record the LV image combined with the OSD and the transparency setting task has set the transparency of OSD for recording when recording of the image file is started, the control task displays a guide for showing how to display the OSD superimposed on the LV image at the set transparency of OSD for recording.

3. The image capturing control apparatus according to claim 1, wherein in a state where the display of the OSD is changed, and the combined recording-setting task has set to record the LV image combined with the OSD and the setting by the transparency setting task has set the transparency of OSD for recording when recording of the image file is started, the control task controls to display the OSD superimposed on the LV image at the set transparency of OSD for recording.

4. The image capturing control apparatus according to claim 1, wherein the transparency setting task individually sets the transparency of OSD for display and the transparency of OSD for recording to respective values selected from among the plurality of transparencies according to a user's operation.

5. The image capturing control apparatus according to claim 1, wherein the specific operation is a touch operation performed on the OSD displayed on a touch panel.

6. The image capturing control apparatus according to claim 1, wherein the specific operation is different from an operation for instructing the recording of the LV image combined with the OSD.

7. The image capturing control apparatus according to claim 1, wherein the control task controls, in a state where the combined recording-setting task has set to not record the LV image combined with the OSD, even in a state where the specific operation is performed, to display the OSD superimposed on the LV image at the set transparency of OSD for displaying.

8. An image capturing control method comprising:
   setting a transparency of on screen display (OSD) superimposed on a captured live view (LV) image, wherein the setting individually sets a transparency of OSD for displaying and a transparency of OSD for recording;
   setting whether or not to record the captured LV image combined with the OSD to an image file;
   displaying the OSD superimposed on the LV image at the set transparency of OSD for displaying; and
   in a state where the LV image has been set to record combined with the OSD to the image file, controlling to display the OSD superimposed on the LV image at the set transparency of OSD for recording regardless of the set transparency of OSD for displaying in response to a start of a specific operation, and to display the OSD superimposed on the LV image at the set transparency of OSD for displaying in response to an end of the specific operation.

9. A non-transitory computer-readable storage medium storing a program executable by a computer to execute an image capturing control method comprising:
   setting a transparency of on screen display (OSD) superimposed on a captured live view (LV) image, wherein the setting individually sets a transparency of OSD for displaying and a transparency of OSD for recording;
   setting whether or not to record the captured LV image combined with the OSD to an image file;
   displaying the OSD superimposed on the LV image at the set transparency of OSD for displaying; and
   controlling, in a state where the LV image has been set to record combined with the OSD to the image file, to display the OSD superimposed on the LV image at the set transparency of OSD for recording regardless of the set transparency of OSD for displaying in response to start of a specific operation, and to display the OSD superimposed on the LV image at the set transparency of OSD for displaying in response to ending of the specific operation.

10. The image capturing control apparatus according to claim 1, wherein:
    the at least one processor or circuit is configured to further execute a recording-control task that controls to record a moving image captured by the image capturing unit, wherein in the state where the combined recording-setting task has been set to record the LV image combined with the OSD to the image file, the recording-control task controls to record the moving image captured by the image capturing unit combined with the OSD at the set transparency of OSD for recording, and
    in a state where the specific operation is not performed while the control task is controlling to record the moving image captured by the image capturing unit combined with the OSD at the set transparency of OSD for recording, the control task controls to display the OSD superimposed on the LV image at the set transparency of OSD for displaying.

11. The image capturing control apparatus according to claim 10, wherein, regardless of whether or not the moving image captured by the image capturing unit is being recorded, in the state where the combined recording-setting task has been set to record the LV image combined with the OSD to the image file, the control task controls to display the OSD superimposed on the LV image at the set transparency of OSD for:

recording in response to the specific operation; and displaying while the specific operation is not performed.

12. The image capturing control apparatus according to claim 1, wherein:

the specific operation is an operation performed on a specific operation section, and in the state where the combined recording-setting task has been set to record the LV image combined with the OSD to the image file, the control task controls to display the OSD at the set transparency of OSD for:

recording in response to a press on the specific operation section; and displaying in response to a release of the press on the specific operation section.

13. The image capturing control apparatus according to claim 1, wherein the control task controls to display information as the OSD indicating a status of or settings for an image capturing apparatus including the image capturing unit, superimposed on the LV image.

14. The image capturing control apparatus according to claim 1, wherein the control task controls to display a character string or an icon indicating a setting for capturing, as the OSD, superimposed on the LV image.

\* \* \* \* \*